UNITED STATES PATENT OFFICE 2,664,342

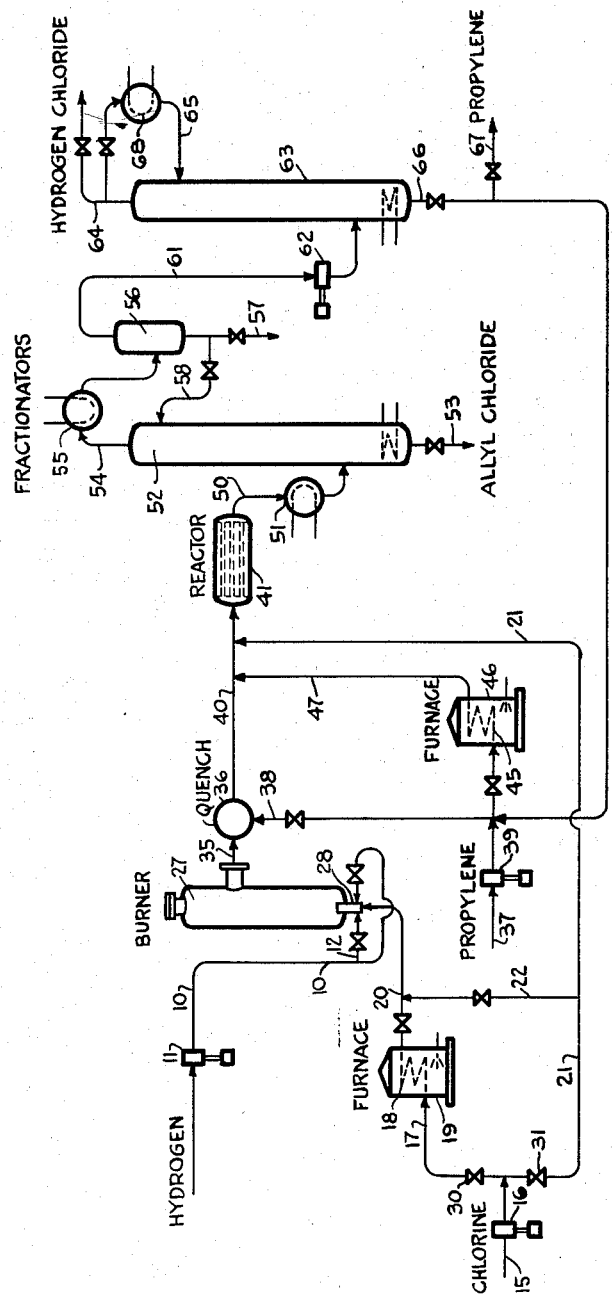

HYDROGEN HALIDE PRODUCTION

Ava J. Johnson, Oakland, Calif., assignor to Shell Development Company, Emeryville, Calif., a corporation of Delaware Application November 20, 1950, Serial No. 196,676

8 Claims. (Cl. 23—154)

This invention relates to the production of hydrogen halides. The invention relates more particularly to the production of anhydrous hydrogen halide of high purity which is free of any substantial amount of hydrogen and/or free halogen.

Efficient execution of many processes involving the use of hydrogen halide as starting or intermediate material is often dependent upon availability of a source of high purity hydrogen halide at a cost commensurate with practical scale operation. Methods employed heretofore in the large scale production of hydrogen halide often result in reaction mixtures comprising impurities not readily removed therefrom. Hydrogen chloride obtained by reacting hydrogen with chlorine by methods often used heretofore generally consists of a mixture containing the hydrogen chloride in admixture with chlorine and hydrogen. Since suitability of a hydrogen halide for use in many operations is often dependent upon the substantially complete absence therein of such reactive materials as hydrogen and free halogen, additional purifying steps are generally needed. Methods involving steps such as scrubbing with a solvent, for example, water are generally highly impractical because of corrosion problems thereby occasioned and because the hydrogen halide must often be used in anhydrous state. The operative steps involved in the purification of these reaction mixtures are often sufficiently costly and complex to render highly uneconomical reliance upon these materials as a source of hydrogen halide of high purity. The production of hydrogen halide, such as hydrogen chloride, by the reaction of hydrogen with chlorine is generally further handicapped by difficulties unavoidably inherent in the methods generally employed heretofore. Thus, in the burning of hydrogen with chlorine as practiced heretofore, the gaseous components had to be charged to the burner of the process in substantially equal molecular amounts and little variation in such ratio could be tolerated without serious consequences. Such lack of flexibility of the process and consequent need for continuous rigid control with concomitant increase in cost and operational difficulties still fails to eliminate to any substantial degree the hazards inherent in the treatment of such mixtures.

It is an object of the present invention to provide an improved process for the production of hydrogen halide wherein the difficulties above referred to are obviated to at least a substantial degree.

It is a further object of the invention to provide an improved process enabling the more efficient production of anhydrous hydrogen halide of high purity which is free of any substantial amount of free hydrogen and/or halogen.

A more particular object of the invention is the provision of an improved process enabling the more efficient production of anhydrous hydrogen chloride of high purity from hydrogen and chlorine. Other objects and advantages of the invention will become apparent from the following description thereof.

In accordance with the invention, anhydrous hydrogen halide of high purity, free of any substantial amount of hydrogen and/or halogen, is produced by reacting hydrogen with a halogen in the presence of a molecular excess of the halogen, thereby obtaining a reaction product consisting essentially of hydrogen halide and unconverted halogen which is free of any substantial amount of hydrogen. A hydrocarbon is added to the hydrogen halide-containing reaction mixture thus obtained and the resulting mixture subjected to hydrocarbon halogenating conditions in the presence of an excess of the added hydrocarbon, thereby effecting the reaction of substantially all of the halogen in the mixture with the hydrocarbon with the formation of a reaction mixture consisting essentially of halogenated hydrocarbon, hydrogen halide, and unconverted hydrocarbon. Hydrogen halide in substantially anhydrous form substantially free of hydrogen and/or halogen is separated from the reaction mixture.

The invention is applied broadly to the conversion of halogens to the corresponding hydrogen halides regardless of the source of the specific halogen employed as charge to the process. Halogens converted to the corresponding hydrogen halides in accordance with the invention comprise the halogens having an atomic number of from 9 to 35, inclusive. The invention is, however, applied with particular advantage to the conversion of a halogen having an atomic number of from 17 to 35, inclusive, that is, chlorine and bromine, to the corresponding hydrogen halide.

The hydrogen reacted with the halogen in accordance with the invention is obtained from any suitable source, and may contain normally gaseous materials which are substantially inert under the conditions of execution of the process of the invention and which are readily separable from the hydrogen halide product of the process. The presence of components in the hydrogen or halogen charge which are not readily removed from the product, and the presence of which is undesirable in the hydrogen halide, are preferably removed therefrom by conventional means prior to introduction of these starting materials into the system. The halogen and/or hydrogen charged to the system may be subjected, for example, to any conventional purification step involving such operations as scrubbing, absorption, adsorption, dehydration, and the like, to effect the removal therefrom of normally gaseous, normally liquid or normally solid impurities. Thus, the normally gaseous streams charged to the process of the invention may be passed through suitable beds of solid contact materials, such as, for example, adsorptive alumina, adsorptive clay, charcoal, silica gel, and the like, under conditions conducive to the separation of moisture or other impurities.

Interaction of the halogen and the hydrogen in the hydrogen halide forming zone of the process is effected at any suitable conditions under which these components react with the formation of hydrogen halide. An essential feature of the invention, however, is the execution of the reaction in the presence of an amount of the halogen exceeding the molecular amount of the hydrogen present thereby assuring the substantially complete conversion of the hydrogen charged to the corresponding hydrogen halide with the production of a reactor outlet free of any substantial amount of free hydrogen. In general, it is preferred to maintain the mol ratio of halogen to hydrogen charged to the process in excess of 1.5. A suitable ratio of halogen to hydrogen in the charge comprises, for example, from about 2 to about 20; particularly preferred conditions comprise the maintenance of the ratio of halogen to hydrogen in the range of from about 5 to about 15. Higher proportions of the halogen may, however, be employed within the scope of the invention. The reaction of the hydrogen with the halogen may be carried out at pressures ranging from about subatmospheric to superatmospheric. Suitable pressures comprise, for example, those in the range from about atmospheric pressure to about 50 atmospheres.

Any suitable reactor comprising, for example, one of tubular or chamber-type may be employed in the step of the process wherein hydrogen halide is produced by the reaction of a halogen with hydrogen. The reaction may be carried out in the absence of catalysts or packing materials or in the presence of catalysts, activators, packing materials, or the like, heretofore disclosed as capable of aiding in the production of hydrogen halide from hydrogen and halogen. Suitable types of apparatus which may be comprised in the reaction zone of the process wherein hydrogen halide is produced from the hydrogen and halogen charge comprises "burner" type of reactors such, for example, as described in U. S. Patent 2,444,256.

The effluent stream from the reaction zone wherein the halogen and hydrogen are caused to interact, consisting essentially of hydrogen halide and unconverted halogen, is admixed with a hydrocarbon and subjected in a halogenation zone to conditions effecting the selective reaction of the hydrocarbon with the halogen with the formation of a reaction mixture consisting essentially of halogenated hydrocarbon and hydrogen halide. An essential and limiting feature of the invention comprises the addition of the hydrocarbon in sufficient amount to assure the interaction of substantially all of the halogen present in the halogenation zone with the hydrocarbon, thereby assuring the absence of any substantial amount of halogen in the effluent stream from the halogenation zone.

The invention is not limited to the addition of any specific hydrocarbon to the effluent stream from the hydrogen halide producing zone, or to the use of specific selective hydrocarbon halogenating conditions. Any hydrocarbon may be employed which is capable of reacting selectively with the halogen in the presence of the hydrogen halide leaving the hydrogen halide unaffected. The hydrocarbon added to the effluent stream from the hydrogen halide producing zone may comprise, for example, one or more saturated or unsaturated hydrocarbons, or a mixture of two or more saturated or unsaturated hydrocarbons including hydrocarbon fractions. The conditions maintained in the hydrocarbon halogenating zone are those disclosed in the prior art as capable of effecting the interaction of the hydrocarbon with the halogen in the absence of any substantial reaction with hydrogen halide. The reaction may be of the substitutive-halogenation or additive-halogenation type. Preferred hydrocarbons added to the effluent stream emanating from the hydrogen halide producing zone are the unsaturated hydrocarbons, particularly the olefinic hydrocarbons comprising, for example, ethylene, propylene, the butylenes, pentenes, hexenes, heptenes, their homologues, and halogen substituted derivatives. In a preferred method of carrying out the invention the halogenation carried out in the hydrocarbon halogenating zone of the process is a substitutive halogenation. Suitable substitutive olefin halogenating conditions are disclosed, for example, in U. S. Patents 2,130,084, 2,167,927, and 2,474,206.

It is particularly preferred to add to the effluent stream from the hydrogen halide producing zone of the process an unsaturated hydrocarbon capable of undergoing allylic substitution and to maintain in the hydrocarbon halogenating zone of the process substitutive halogenating conditions resulting in allylic halo-substitution of the added olefins with the formation of the corresponding allyl-type halides. Unsaturated hydrocarbons capable of undergoing halo-substitution to form the allyl-type halides comprise the unsaturated hydrocarbons and halo-substituted unsaturated hydrocarbons which contain an olefinic linkage between two non-tertiary carbon atoms of aliphatic character, at least one of which is of secondary character.

Representative unsaturated compounds of the class which may be halo-substituted to valuable allyl-type halides in accordance with the process of the invention are the secondary olefins such as propylene, the normal butylene (butene-1 and butene-2), the normal amylenes, secondary isoamylene (isopropyl ethylene), the normal hexenes, the iso-hexenes of secondary character, the normal heptenes, the iso-heptenes of secondary character, and the straight and branched chain secondary octylenes, nonylenes, and the like; the halo-substituted normal and branched chain secondary olefins, such as 1 - chloropropene-1, 1-bromopropene-1, 2-chloropropene-1, 2-bromopropene-1, 1-chlorobutene-1, 1-bromobutene-1, 2-chlorobutene-1, 1,2-dichlorobutene-1, 1-chlorobutene-2, 2-chlorobutene-2, 1,2-dichlorobutene-2, 4-chlorobutene-1, 1,4-dichlorobutene-1, 1-chloropentene-1, 1-chloropentene-2, 1-chloro 3 - methylbutene - 1, 1 - chloro - 3 - methylbutene-1, 1-chloro-3-methylbutene-2, 2-chloro-3-methylbutene-2, and the like, and their homologues and analogues. The halo-substitution of cyclic olefinic compounds of secondary character and halo-substitution products thereof is also within the scope of the invention. Suitable reactants of this type are cyclobutene, cyclopentene, cyclohexene, tetrahydrobenzene, the cycloheptenes, cycloheptadiene, the cyclooctenes, and the like, as well as the halo-substituted cyclic olefins. The secondary olefins, the cyclic olefins of secondary character and the halo-substitution products of such compounds of aliphatic character may be linked to one or more cycloalkyl and/or aromatic radicals. For example, compounds such as 1-phenylpropene-2, 1-phenyl-2-chloropropene-2, 1-phenylbutene-2, and the like may be halogenated by allylic halogen substitution in accordance with the process of the invention. The added unsaturated compound may contain one or a plurality of olefinic linkages; it is only essential that at least one olefinic linkage between two secondary carbon atoms or between a secondary carbon atom and a primary carbon atom be in the allyl position to at least one carbon atom possessing a replaceable hydrogen atom. Thus, diolefinic compounds such as pentadiene-1,4, hexadiene-1,5, 2-methylhexadiene-1,5, and the like may be advantageously halo-substituted to the corresponding allyl-type halides.

Suitable conditions to be maintained in the hydrocarbon halogenating zone of the process to obtain the allylic substitution of the unsaturated hydrocarbon comprise the use of an elevated temperature at which allylic halogen-substitution takes place but below the temperature of which substantial degradation, such as cracking, polymerization, etc. of the organic reactant and/or product occurs. Suitable temperatures which may be used to effect the allylic halo-substitution of the added unsaturated hydrocarbon comprises a temperature of about 200° C. and higher but below the temperature at which substantial decomposition or side-reaction of the reactants is encountered. Generally temperatures in the range of from about 200° C. to about 700° C. and preferably from about 200° C. to about 500° C. may be employed. Suitable conditions for effecting the allylic halo-substitution reaction comprise those disclosed in U. S. Patent 2,130,084.

In order that the invention may be more readily understood, the following detailed description of the invention is made with reference to the attached drawing forming a part of the present application and wherein the single figure represents one form of apparatus suitable for carrying out the process of the invention.

Referring to the drawing, a halogen, for example chlorine, is taken from an outside source and forced through lines 15 and 17, by means of pump 16, into a preheating coil 18 positioned in a furnace structure 19. Within coil 18 the chlorine is heated to an elevated temperature. The heated chlorine stream is passed from coil 18, through transfer line 20, into a hydrogen burning zone. The hydrogen burning zone may comprise, for example, a chamber 27 provided with a suitable mixing nozzle 28 receiving the effluent from transfer line 20. A normally gaseous stream consisting essentially of hydrogen is taken from an outside source and forced through line 10, by means of pump 11, into mixing nozzle 28. To assure intimate and rapid mixing of the hydrogen with the halogen the hydrogen charge may enter mixing nozzle 28 in a plurality of streams represented in the attached drawing by valved by-pass line 12 leading from line 10 into nozzle 28. The mixture of hydrogen and chlorine discharges from mixing nozzle 28 into chamber 27 wherein interaction of the hydrogen and chlorine takes place with the formation of hydrogen chloride.

Initiation of the reaction of hydrogen with chlorine is caused to take place by heating the chlorine stream passing through coil 18. Heat input into coil 18 is controlled to result in raising the mixed hydrogen-chlorine stream entering chamber 27 to reaction temperature. The initiation temperature required will depend to some extent upon the ratio of chlorine to hydrogen charged and the pressure employed within chamber 27. It has been found that a temperature in the range of, for example, from about 275° C. to about 375° C. is a satisfactory initiation temperature. Additional conventional devices to aid in the initiation of the reaction, not shown in the drawing, may be resorted to. Once under way, the reaction being highly exothermic, will continue without need for further substantial preheating of the chlorine charge. By control of valves 30 and 31 part or all of the chlorine charged may be caused to by-pass heating coil 18 and flow through valved lines 21 and 22 into transfer line 20.

An essential and limiting feature of the invention is the introduction of the chlorine into chamber 27 in sufficient amount to maintain the halogen in substantial molecular excess over the hydrogen. Chlorine introduced into the system is controlled to maintain the mole ratio of chlorine to hydrogen entering chamber 27 at 1.5 or higher and preferably in excess of 2. Particularly suitable molar ratios of chlorine to hydrogen to be maintained comprise a range of from about 2.5 to about 20 and still more preferably from about 5 to 15.

Temperatures within chamber 27 are controlled to assure the continuance of the reaction. A temperature within chamber 27 in the range of, for example, from about 250° C. to about 600° C. and preferably from about 300° C. to about 500° C. may be employed. The use of higher or lower temperatures may, however, be employed in chamber 27 within the scope of the invention. Desired temperature conditions are maintained in chamber 27 once the reaction has been initiated by varying the ratio of hydrogen to chlorine within the permissible prescribed range and/or by the withdrawal of heat from chamber 27 by suitable conventional means not shown in the drawing. Pressures maintained in chamber 27 may range from subatmospheric to superatmospheric. Suitable pressures comprise those in the range of from about atmospheric to about 50 atmospheres, and preferably from about atmospheric to about 30 atmospheres. Chamber 27 is preferably constructed of corrosion resistant material such as, for example, nickel.

Under the above defined conditions substantially all of the hydrogen introduced into the system is converted to hydrogen halide resulting in an effluent stream from chamber 27 consisting essentially of hydrogen chloride and chlorine containing substantially no hydrogen. The ability to maintain the chlorine in substantial excess within chamber 27 in the process of the invention therefore eliminates not only the dangers inherent in the handling of mixtures more nearly approaching explosive conditions which are difficult to control, and the need for continual precise control of the hydrogen burner, but obviates completely the problem of hydrogen removal from the resultant reaction mixture even under highly flexible conditions of operation.

The efficiency with which the reactants consisting of hydrogen and a molecular excess of chlorine are converted to a reaction mixture consisting essentially only of hydrogen chloride and unconverted chlorine containing substantially no free hydrogen is evidenced by the following example.

*Example I*

In a plurality of separate continuous operations a chlorine stream was preheated and thereafter mixed with a stream of hydrogen in a mixing nozzle discharging into a tubular reactor maintained at uniform reaction temperature. Those portions of the reaction system in contact with hot chlorine were constructed of nickel. The composition of the off gas was determined. Conditions of operation and results obtained in each of the separate operations are indicated in the following Table I:

*Table I*

| Run No. | 1 | 2 | 3 | 4 | 5 | 6 | 7 | 8 | 9 |
|---|---|---|---|---|---|---|---|---|---|
| Feed rate, grams-moles/hr: | | | | | | | | | |
| Chlorine | 7.3 | 1.83 | 7.3 | 2.85 | 3.14 | 5.25 | 4.95 | 2.67 | 4.95 |
| Hydrogen | 0.73 | 0.183 | 1.46 | 0.57 | 1.57 | 1.05 | 0.495 | 1.78 | 0.495 |
| Feed molar ratio, $Cl_2/H_2$ | 10 | 10 | 5 | 5 | 2 | 5 | 10 | 1.5 | 10 |
| Reactor, temp., °C | 500 | 500 | 500 | 400 | 400 | 400 | 325 | 400 | 300 |
| Chlorine preheat, temp., °C | 240 | 220 | 240 | 200 | 50 | 230 | 190 | 160 | 190 |
| Reactor pressure, p. s. i. g | 0 | 0 | 0 | 0 | 0 | 25 | 0 | 0 | 0 |
| Time, sec | 1.6 | 6.4 | 1.5 | 3.2 | 3.2 | 6.4 | 3.2 | 4 | 3.2 |
| Composition of product gas, mol percent: | | | | | | | | | |
| Chlorine | 81.8 | 81.8 | 66.7 | 66.7 | 33.3 | 66.7 | 81.9 | 20 | 81.9 |
| Hydrogen chloride | 18.1+ | 18.1+ | 33.3+ | 33.3+ | 66.7+ | 33.3+ | 18.0 | 80 | 18.0 |
| Hydrogen | <0.1 | <0.1 | <0.1 | <0.1 | <0.1 | <0.1 | <0.1 | <0.1 | <0.1 |
| Hydrogen conversion, percent | >99.9 | >99.9 | >99.9 | >99.9 | >99.9 | >99.9 | 99.5 | 100 | 99.5 |

Tubular reactors contained no contact material except in run No. 4 wherein it was packed with pieces of nickel tubing.

The effluent stream from chamber 27 consisting essentially of hydrogen chloride and chlorine, and containing substantially no free hydrogen is passed through line 35 into a quench chamber 36. Within chamber 36 the effluent stream from chamber 27 is quenched by admixture of an unsaturated hydrocarbon such as, for example, an olefinic hydrocarbon, introduced into chamber 36 from an outside source through valved lines 37 and 38 provided with pump 39. A preferred unsaturated hydrocarbon comprises an olefin capable of undergoing allylic halo-substitution such as a secondary olefin, for example, propylene. The mixture of hydrogen chloride, chlorine, and added propylene is passed from chamber 36 through line 40 into a hydrocarbon halogenating zone. The halogenating zone may comprise a chamber containing a bundle of tubular reactors arranged in parallel flow such as, for example, tubular reactor 41. Within reactor 41 the mixture is subjected to conditions of chloro-substitution resulting in the reaction of the chlorine with the propylene to result in a reaction mixture consisting essentially of chlorinated propylene and hydrogen chloride substantially free of chlorine. Care is taken to add the propylene to the effluent stream emanating from chamber 27 in sufficient amount to assure the complete interaction of substantially all of the free chlorine with propylene. Introduction of propylene into quench chamber 36 is generally controlled to bring the temperature of the resulting mixture to that assuring maintenance of the reaction temperature in reactor 41. If the amount of propylene introduced into the system exceeds that required to quench the effluent stream from chamber 27 to the temperature assuring maintenance of the reaction temperature in reactor 41, such excess added propylene is passed through valved line 37 into heating coil 45, positioned in furnace structure 46, and thence into line 40 leading into reactor 41. A sufficiently high heat input into the stream flowing through coil 45 is maintained to obtain the chloro-substitution conditions in reactor 41.

When it is desired to effect the production of supplementary chlorinated propylene exceeding in amount that normally obtained by reliance upon the free chlorine in the stream emanating from chamber 27, additional chlorine is passed through line 21 into line 40 to react with propylene in reactor 41. Care is always taken, however, to have the amount of chlorine introduced into chamber 27 always exceeding the stoichiometrically equivalent amount of hydrogen introduced, and to have the amount of propylene introduced into reactor 41 always at least equal to, and preferably in excess of, the total stoichiometrically equivalent amount of free chlorine introduced into reactor 41. A suitable ratio of propylene to free chlorine in the mixture charged to reactor 41 comprises, for example, from about 1.5:1 to about 15:1 and preferably from about 2:1 to about 7:1.

As indicated above, preferred conditions to be maintained within reactor 41 comprise conditions resulting in the allylic chlor-substitution of propylene with the formation of allyl chloride. Suitable conditions to be maintained within reactor 41 comprise, for example, a temperature in the range of from about 200° C. to about 700° C. and preferably from about 350° C. to about 675° C. Under the conditions set forth herein, the reaction of the unsaturated hydrocarbon with chlorine will be substantially complete and the effluent stream flowing from reactor 41 will consist essentially of the chlorinated hydrocarbon, which in the case of the allylic chlor-substitution of propylene will be allyl chloride, and hydrogen chloride containing substantially no free halogen.

The following examples are illustrative of the selective removal of the residual chlorine from the hydrogen-chloride-containing effluent from chamber 27 in accordance with the invention.

EXAMPLE II

In two separate continuous operations propylene is added to a mixture of hydrogen chloride and chlorine to result in a mixture containing chlorine, hydrogen chloride and propylene in the approximate molar ratio of 1:1:4, respectively. The resulting mixture is subjected to chlorinating conditions in a tubular reactor maintained at 420° C. to 600° C. (wall temperatures). The mixture is passed through the reactor at a space velocity of 0.5 vol. feed/vol. reactor space/sec. Reaction products are separated by cooling and fractionation to result in an anhydrous gaseous fraction consisting essentially of propylene and hydrogen chloride free of any determinable amount of chlorine, and a normally liquid fraction consisting of chlorinated propylene. The liquid fraction separated in one operation contained 49.8% by weight of allyl chloride and that separated in the other contained 69% by weight of allyl chloride. The remainder of the liquid fractions consist essentially of propylene dichloride. Anhydrous hydrogen chloride containing no determinable amount of free chlorine or free hydrogen is separated from propylene by fractionation and recovered as a final product.

Essential to the obtaining of a high purity hydrogen halide is the complete consumption of hydrogen in the hydrogen burning step of the process which is made possible in the process of the invention by the execution of the step in the presence of an amount of halogen exceeding the stoichiometrically equivalent amount. Selective removal of hydrogen from admixture with hydrogen chloride and chlorine is not brought about by subjection of the mixture, in the presence of added hydrocarbon, to allylic halo-substituting conditions as evidenced by the following example:

EXAMPLE III

In a continuous operation A propylene was chlorinated by subjection of a mixture of propylene and chloride to the chlorinating conditions indicated in column A of the following Table II.

In three separate operations B, C and D, propylene was chlorinated under conditions which were substantially identical to the conditions employed in operation A with the exception that hydrogen was added to the feed. Conditions employed are indicated for each of the runs B, C, and D in the following Table II in columns B, C and D.

The composition of reactor effluence was determined in each of the separate operations and is indicated in the following Table II.

Table II

|  | A | B | C | D |
|---|---|---|---|---|
| Hydrogen feed, percent mole of propylene | 0 | 5 | 10 | 15 |
| Feed rate, gram moles/hr.: | | | | |
| Propylene | 8 | 8.43 | 8.43 | 8.43 |
| Chlorine | 2.66 | 2.81 | 2.81 | 2.81 |
| Hydrogen | 0 | 0.42 | 0.84 | 1.26 |
| Reactor temp., °C | 510 | 510 | 510 | 510 |
| Reactor pressure, p. s. i. g. | 0 | 0 | 0 | 0 |
| Residence time | 1.2 | 1.1 | 1.1 | 1.0 |
| Composition of reactor effluence, mole percent: | | | | |
| Propylene | 52.5 | 51.6 | 46.5 | 46.1 |
| Hydrogen | 0 | 5.1 | 8.2 | 10.7 |
| Hydrogen chloride | 25.2 | 22.7 | 24.6 | 23.1 |
| Allyl chloride | 18.0 | 17.4 | 17.3 | 16.7 |
| Propyl chloride | 3.92 | 3.04 | 3.02 | 3.1 |
| Heavy ends | 0.3 | 0.2 | 0.4 | 0.3 |
| Hydrogen feed-moles (based on nominal feed rates) | 0 | 2.02 | 4.20 | 6.30 |
| Hydrogen recovered-moles (based on analysis) | 0 | 2.78 | 4.68 | 6.42 |

It is seen from the foregoing example that in the chlorination of hydrocarbons in the presence of hydrogen the hydrogen is recovered unchanged from the hydrogen chloride-containing reactor effluence while the propylene is preferentially chlorinated to its normal product distribution.

Hydrogen chloride is readily separated from the effluent stream leaving reactor 41 by conventional practical scale separating methods. In one method of product recovery effluence from reactor 41 consisting essentially of allyl chloride, hydrogen chloride and residual propylene, is passed through line 50 provided with suitable cooling means, such as, for example, cooler 51, into a suitable product fractionating zone comprising, for example, fractionator 52. Within fractionator 52 a gaseous fraction comprising hydrogen chloride and propylene is separated from a liquid fraction comprising allyl chloride. The liquid fraction comprising allyl chloride is taken from fractionator 52 by means of valved line 53, and eliminated from the system. The gaseous fraction comprising hydrogen chloride and propylene is taken from fractionator 52 through line 54 provided with partial condenser 55 and introduced into an accumulator 56. Condensate, comprising propylene, is withdrawn from accumulator 56 through valved line 57 and passed at least in part through valved line 58 into the upper part of fractionator 52 as reflux.

The uncondensed gaseous stream, consisting essentially of hydrogen chloride and propylene is passed from accumulator 56, through line 61 provided with compressor 62, into fractionator 63. Within fractionator 63 a gaseous overhead fraction consisting essentially of high purity, anhydrous hydrogen chloride is separated from a liquid fraction consisting essentially of propylene. The overhead fraction consisting essentially of hydrogen chloride is withdrawn from fractionator 63 through valved line 64 as a final product. A portion of the gaseous stream passing through valved line 64 is by-passed through line 65, provided with cooler 68, and returned as reflux to the upper part of fractionator 63.

The liquid fraction consisting essentially of propylene is taken from fractionator 63 by means of valved line 66 and recycled in part or entirety into line 37. A valved line 67 is provided for the elimination from the system of at least a part of the fraction comprising propylene flowing through valved line 66 should this be desired.

It is thus seen that in the process of the invention the excess of the chloride introduced into chamber 27, which enabled the hydrogen burning to proceed with complete consumption of the hydrogen without hazard, is converted to chlorinated hydrocarbons comprising highly desirable allyl chloride and additional amounts of the desired high purity hydrogen chloride. It is seen, furthermore, that the removal of the residual free chlorine is effected with the utilization of substantially all latent heat contained in the effluent stream from the hydrogen burner thereby enabling the production of the high purity anhydrous hydrogen chloride to proceed not only with a minimum of operative steps allowing great flexibility but with unusual economy.

The invention claimed is:

1. The process for the production of high purity hydrogen chloride which comprises reacting hydrogen with chlorine in a mol ratio of chlorine to hydrogen of at least 1.5 thereby forming a mixture of hydrogen chloride and chlorine substantially free of free hydrogen, adding propylene to said mixture in an amount at least equal to the stoichiometrical equivalent of chlorine in said mixture, subjecting the resulting mixture comprising hydrogen chloride, chlorine and propylene to selective propylene chloro-substituting conditions effecting the selective chlorination of propylene by allylic substitution with the formation of a reaction mixture consisting essentially of hydrogen chloride and chlorinated hydrocarbons comprising allyl chloride substantially free of free chlorine and free hydrogen, and fractionating high purity hydrogen chloride from said reaction mixture.

2. The process for the production of high purity hydrogen chloride in accordance with claim 1 wherein said hydrogen is reacted with said chlorine in the presence of an amount of chlorine in the range of from about 2 to about 20 mols of chlorine per mol of hydrogen present.

3. The process in accordance with claim 2 wherein said selective chloro-substitution of propylene is effected at a temperature in the range of from about 350° C. to about 675° C.

4. The process for the production of high purity hydrogen chloride which comprises reacting hydrogen with chlorine in a mol ratio of chlorine to hydrogen of at least 1.5 thereby forming a mixture of hydrogen chloride and chlorine substantially free of free hydrogen, adding a secondary olefin to said mixture in an amount at least equal to the stoichiometrical equivalent of chlorine in said mixture, subjecting the resulting mixture comprising hydrogen chloride, chlorine and secondary olefin to selective olefin chloro-substituting conditions effecting the selective chlorination of said secondary olefin by allylic substitution with the formation of a reaction mixture consisting essentially of hydrogen chloride and chlorinated hydrocarbons comprising allyl-type chloride substantially free of free chlorine and free hydrogen, and separating high purity hydrogen chloride from said reaction mixture.

5. The process for the production of high purity hydrogen halide which comprises reacting hydrogen with a halogen having an atomic number of from 17 to 35, inclusive, in a mol ratio of said halogen to hydrogen of at least 1.5 thereby forming a mixture of hydrogen halide and halogen substantially free of free hydrogen, adding propylene to said mixture in an amount at least equal to the stoichiometrical equivalent of halogen in said mixture, subjecting the resulting mixture comprising hydrogen halide, halogen and propylene to selective propylene halo-substituting conditions effecting the selective halogenation of propylene by allylic substitution with the formation of a reaction mixture consisting essentially of hydrogen halide and halogenated hydrocarbons comprising allyl halide substantially free of free halogen and free hydrogen, and fractionating high purity hydrogen halide from said reaction mixture.

6. The process for the production of high purity hydrogen halide in accordance with claim 5 wherein said selective propylene substitutive halogenation is effected at a temperature of from about 200° C. to about 700° C.

7. The process for the production of high purity hydrogen halide which comprises reacting hydrogen with a halogen having an atomic number of from 17 to 35, inclusive, in a mol ratio of said halogen to hydrogen of at least 1.5 thereby forming a mixture of hydrogen halide and halogen substantially free of free hydrogen, adding a secondary olefin to said mixture in an amount at least equal to the stoichiometrical equivalent of halogen in said mixture, subjecting the resulting mixture comprising hydrogen halide, halogen and secondary olefin to selective halo-substituting conditions effecting the selective halogenation of said secondary olefin by allylic substitution with the formation of a reaction mixture consisting essentially of hydrogen halide and halogenated hydrocarbons comprising allyl-type halides substantially free of free halogen and free hydrogen, and separating high purity hydrogen halide from said reaction mixture.

8. The process for the production of high purity hydrogen halide in accordance with claim 7 wherein said hydrogen is reacted with said halogen in the presence of an amount of halogen in the range of from about 2 mols to about 20 mols of halogen for each mol of hydrogen present.

AVA J. JOHNSON.

References Cited in the file of this patent

UNITED STATES PATENTS

| Number | Name | Date |
|---|---|---|
| 779,998 | Gibbs | Jan. 10, 1905 |
| 1,414,762 | Townsend | May 2, 1922 |
| 2,130,084 | Groll et al. | Sept. 13, 1938 |
| 2,167,927 | Groll et al. | Aug. 1, 1939 |
| 2,227,953 | Baehr et al. | Jan. 7, 1941 |
| 2,472,610 | Nixon et al. | June 7, 1949 |
| 2,491,786 | Weinrich | Dec. 20, 1949 |
| 2,585,469 | Johnson | Feb. 12, 1952 |

OTHER REFERENCES

Ephraim's, "Inorganic Chemistry," 1943 ed., page 216, Nordeman Publishing Co., Inc., New York, New York.

Fuson's, "Organic Chemistry," page 231, 1942 ed., John Wiley and Sons, Inc., New York.